United States Patent [19]
Williamson

[11] Patent Number: 5,533,764
[45] Date of Patent: Jul. 9, 1996

[54] TRANSVERSE HYDRAULIC COUPLING WITH LIPPED PORT

[75] Inventor: Nigel D. L. Williamson, Fort Wayne, Ind.

[73] Assignee: NWD International, Inc., Morencie, Mich.

[21] Appl. No.: 232,734

[22] Filed: Apr. 25, 1994

Related U.S. Application Data

[63] Continuation-in-part of PCT/US92/09035, Oct. 22, 1992, which is a continuation-in-part of Ser. No. 782,409, Oct. 25, 1991, abandoned.

[51] Int. Cl.$^6$ .................................................. F16L 5/02
[52] U.S. Cl. ..................... 285/212; 285/190; 285/382.7
[58] Field of Search .................................... 285/212, 190, 285/382.7, 332.3

[56] References Cited

U.S. PATENT DOCUMENTS

| | | | |
|---|---|---|---|
| 2,496,149 | 1/1950 | Cahenzli, Jr. | 285/126 |
| 2,826,438 | 3/1958 | Woodling | 285/342 |
| 2,942,895 | 6/1960 | Lyon | 285/212 |
| 3,003,795 | 10/1961 | Lyon | 285/212 |
| 3,145,035 | 8/1964 | Hanback | 285/110 |
| 3,151,893 | 10/1964 | Lyon | 285/158 |
| 3,151,896 | 10/1964 | Kody | 285/212 |
| 3,201,153 | 8/1965 | Currie | 285/249 |
| 3,219,366 | 11/1965 | Franck | 285/190 |
| 3,315,988 | 4/1967 | Schroter | 285/190 |
| 4,142,741 | 3/1979 | Fiala | 285/190 |
| 4,934,742 | 6/1990 | Williamson | 285/212 |
| 5,052,724 | 10/1991 | Konrad et al. | 285/190 |

FOREIGN PATENT DOCUMENTS

| | | | |
|---|---|---|---|
| 1507625 | 11/1967 | France. | |
| 22588 | 1/1962 | Germany | 285/190 |
| 53477 | 1/1967 | Germany. | |
| 1918012 | 12/1970 | Germany | 285/190 |
| 651499 | 4/1952 | United Kingdom | 285/190 |
| 718264 | 11/1954 | United Kingdom. | |
| 1227037 | 3/1971 | United Kingdom. | |
| 2207722 | 2/1989 | United Kingdom. | |

Primary Examiner—Eric K. Nicholson
Attorney, Agent, or Firm—Baker & Daniels

[57] ABSTRACT

The present invention relates to an improved hydraulic coupling which forms contact seals to fluidly connect a tapered port with a tube having a threaded connecting portion. The contact seals may be metal-to-metal seals, or alternatively may include a resin polymer element. The invention provides a fluid coupling for a tube which is transverse to the port, allowing for flow redirection in the coupling similar to the flow redirection in prior art "banjo" couplings. The body of the port includes a lip which deforms on the inner tapered surface of the fitting, and the fitting also includes an inner tapered surface on which a rim of the bolt contacts, thereby providing a contact seal at both potential leak points. The lipped port may also be provided by a collar disposed between the port and the fitting. Optionally, o-rings may be added to provide additional seals. The present invention may be designed not to seal without the application of tool generated torques.

14 Claims, 8 Drawing Sheets

TRANSVERSE HYDRAULIC COUPLING WITH LIPPED PORT

CROSS-REFERENCE TO RELATED APPLICATIONS

The present application is a continuation-in-part of International Patent Application No. PCT/US92/09035, filed Oct. 22, 1992, that designated the United States, which is a continuation-in-part of U.S. patent application Ser. No. 07/782,409, filed Oct. 25, 1991, now abandoned.

BACKGROUND OF THE INVENTION

The present invention relates to hydraulic couplings. More specifically, the field of the invention is that of hydraulic port fittings such as used in automobiles, aircraft, and the like.

There are many port fittings on the marketplace currently which are designed to connect tubing or hydraulic hose to power equipment such as brake calipers etc. The most frequently used methods of attachment are the "tube-o" and the "banjo" type fittings. The former is used in brake and air conditioning systems, and the latter predominantly in brake systems.

The problem with both technologies is that they are prone to leaks which are both expensive and dangerous. Warranty and in-house costs of fixing such leaks may become quite large, and the environmental consideration of the effects of such loss of contaminating fluids cannot be ignored.

Traditionally, the hydraulics supply industry has recommended better surface finishes and tighter tolerances in manufacture in order to minimize the potential for leaks. This has, however, failed to adequately answer the problem. To adequately address this problem in the "banjo" fitting, the causes of the leaks must be examined. A description of the "banjo" port fitting is presented below which includes an examination of its inherent inadequacies.

"Banjo" fittings are so termed because of their shape, which usually comprises of a tube brazed onto a round component, giving rise to a substantially banjo-shaped assembly.

Referring to FIGS. 1 and 2, which show a prior art "banjo" fitting, a typical banjo fitting is comprised of body 102 through which bolt 103 is assembled. The combination of body 102 and bolt 103 is then assembled to port 101. Sealing of the body/bolt assembly is accomplished with copper (typically) washers 104 and 105, which are placed each side of body 102. Large torques (applied in the radial direction of arrow T of FIG. 4) are employed to obtain a seal between components, which sometimes cannot be sealed. A common failure of this assembly is to snap the bolt or strip the threads of the port while striving to attain sealing contact.

The "banjo" fittings are useful because of their inherent assembly benefits in situations where time taken to assemble and ease of access to components are important considerations. "Banjo" fittings are assembled from the front, and assembly can be effected with power tools. This is not true of other fittings which perform the function served by "banjo" fittings, that of supplying fluid to a component through a 90 degree change of direction or other similar reorientation of fluid flow.

A drawing of an assembled prior art "banjo" fitting is shown in FIGS. 1 and 2, where body 102, shown in partial cut-away, is recessed internally to create flow chamber 124 for pressurized fluid. A recessing operation is required to be done to body 102, rather than in bolt 103, in order to retain as much tensile strength in bolt 103 as possible. If bolt 103 were reduced in diameter to create a flow chamber, insufficient material would remain in bolt 103 to withstand the massive assembly torques required to obtain a seal. The recessing operation required for body 102 is expensive and difficult to control. Also, bolt 103 must be made of relatively high tensile material in order to resist tensile failure due to high torques, and such materials are hard to machine which further complicates the manufacture of prior art "banjo" fittings.

One problem with prior art "banjo" fittings involves the four potential leak-paths in any standard banjo fitting, one on each side of the metal washers 104 and 105 which are located at sealing points 120, 121, 122 and 123 of FIG. 2. Also a problem is that massive torques are required to attain a seal, which in turn, requires a high tensile strength bolt, and an internally recessed body. These are expensive requirements for the manufacture of the "banjo" fitting.

An additional problem involves the lack of any secondary seal in the port interface. Should one of the four metal-to-metal interfaces develop a leak, the only way of overcoming it is to impart greater torque to the assembly. This regularly leads to tensile failures of bolts or stripped threads on bolts or in ports.

Further problems involve shape, size and alignment of the prior art "banjo" fittings. Flow characteristics within the fitting are primarily derived from consideration of tensile strengths rather than from system demand. This often leads to flow restrictions which are not desirable. Also, the face-to-face association of components requires close control in order to form an adequate seal. Concentricity and squareness of through-bores on bodies must be carefully maintained in production, and aligned accurately during assembly, if a seal is to be obtained.

What is needed is an improved hydraulic coupling which utilizes the elastic properties of the materials from which the component parts are made.

A further need is for an improved hydraulic coupling which includes secondary seals.

An additional need exists for an improved hydraulic coupling for systems which includes metal-to-metal seals.

A still further need exists for an improved hydraulic coupling which minimizes the number of potential leak paths.

Yet another need exists for an improved hydraulic coupling which requires less torque for assembly.

SUMMARY OF THE INVENTION

The problems highlighted above involve a single sealing method utilizing metal-to-metal plastic deformation. There is little invocation of elastic memory in this design, as plastic deformation of components occurs as a result of the face-to-face associations of the copper washers. The present invention utilizes tapered surfaces which engage with a high degree of elastic deformation, providing a more reliable seal.

The elastic deformation of mating components is preferred because the elastic memory of the material (either metal or rubber and the like) imparts a continuous sealing force. In comparison, plastic deformation of the material, which permanently deforms the fitting components, imparts no additional sealing force. Both metals and rubber type materials are subject to both forms of deformation, as metal material may be plasticly deformed by high torque when assembled while elastic materials may be plasticly deformed by setting over time.

Embodiments of the present invention impart multiple seals to the port interface, and use elastic memory of metallic components in the interface where possible. This is attained by the use of elastic components in those instances where such is possible or desireable in conjunction with abutting tapered metallic surfaces which allow for the generation of an interface the integrity of which is enhanced by elastic memory. With ports made of softer materials, a metallic component having a complementary taper or a resin polymer component may be used to create a contact seal of similar integrity. The acute tapered metallic surfaces provide a high unit loading which ameliorates the need for the expensive materials needed for receiving the high torques required with prior art fitting components.

The transverse coupling of the present invention is adapted to function similarly to the "banjo" hydraulic fitting. The "banjo" type of connection allows for a change in direction of fluid flow through the coupling. The port for the "banjo" type fitting has internal threads and a tapered lip at the outer end which mates with a body component which bears an inner tapered surface. The body component is bored to accept a threaded bolt, which may engage the threads of the port. At the distal end of the body is located an internal taper which receives a complementary tapered surface on the bolt, such that when the coupling is assembled, the mating tapers are driven together to create metal-to-metal seals between port, body and bolt. Optionally o-rings may be placed on the bolt adjacent the two internal tapers of the body. The o-rings contact the leading ends of the internal tapered surfaces, and contact the abutting facing surfaces, in a manner which allows movement of the o-rings in response to pressure differentials. The o-rings are not crushed, as a gasket, during assembly.

The present invention lowers the number of leak paths associated with "banjo" fittings from four to two, and, when o-rings are used, each potential leak path is controlled by two separate and individually effective seals.

The bolts of the fitting do not have to be made of high tensile materials, so that regular mild steel or even brass may be used. Also, the flow chamber is provided by reducing the diameter on the bolt rather than forming the chamber internally in the body. This is a much simpler operation and considerably less expensive. As assembly torques are so much lower than with conventional "banjo" fittings, it is possible to make the bolt with a socket head rather than an external hexagon head. This makes a very attractive, clean-lined assembly which is lighter in weight than the hex-head bolts. Flow characteristics need not be changed with this design, as there is considerable scope for reduction of wall thickness on both bolt and body, which need only be predicated on pressure retention within the system, rather than on assembly torques. Substantial savings may be enjoyed by the automotive and similar industries which have traditionally spent large sums curing persistent leaks at interfaces of the prior art banjo fittings.

The present invention also provides a structure which works well with plastic port housings yet still takes advantage of the contact sealing of the tapered components. A plastic port housing with an internally tapered port may suffer from hoop stress and cracking under pressure. Failure of the port may be caused by hoop stress due to application of assembly torques. In the present invention, the tapered lip of the port forms a contact seal with the internal taper of the fitting body and opposes both the pressurization forces and the hoop stress associated with assembly.

The present invention, in one form, is a hydraulic coupling comprising a port, a conduit, and a connector. The port includes an opening, a portion defining a passageway in communication with the opening, an internally threaded portion in communication with the passageway, and a tapered lip extending from the port. The conduit provides fluid communication between the port and a tube located transversely in relation to the port. The conduit includes a body defining an axial chamber, and has an extension defining a channel transversely located in relation to the axial chamber. The channel and the passageway are in fluid communication. The conduit further includes an inner surface which forms a sealing contact with the tapered lip of the port. The connector sealingly secures the conduit to the port. The connector extends through the conduit and includes a body with an axial bore. The connector also includes a rim which sealingly contacts the conduit, and an externally threaded portion adapted to engage the internally threaded portion of the port. By threaded engagement of the connector with the port, the lip is forced into sealing contact with the inner surface of the conduit and the rim into sealing contact with the conduit.

One object of the present invention is to provide an improved hydraulic coupling which utilizes the elastic properties of the materials.

Also an object is to provide an improved hydraulic coupling which does not excessively deform o-rings in the coupling.

A further object is to provide an improved hydraulic coupling which includes secondary seals.

An additional object is to provide an improved hydraulic coupling for systems which includes metal-to-metal, plastic-to-metal, or plastic-to-plastic seals.

A still further object is to provide an improved hydraulic coupling which minimizes the number of potential leak paths.

Yet another object is to provide an improved hydraulic coupling which requires less torque for assembly.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with-the accompanying drawings, wherein.

Figure 1:
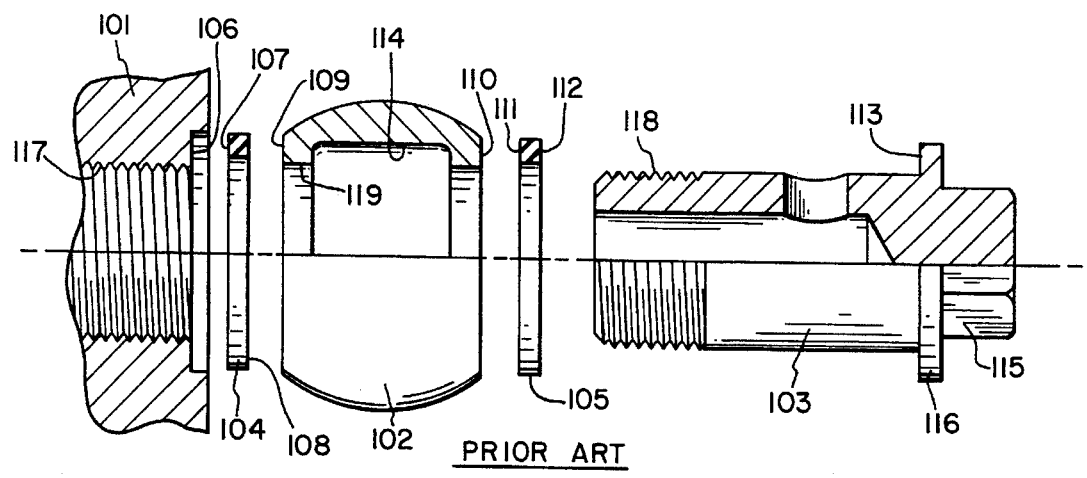
FIG. 1 is a side view, in partial cross section, of a prior art "banjo" coupling before assembly.
Figure 2:
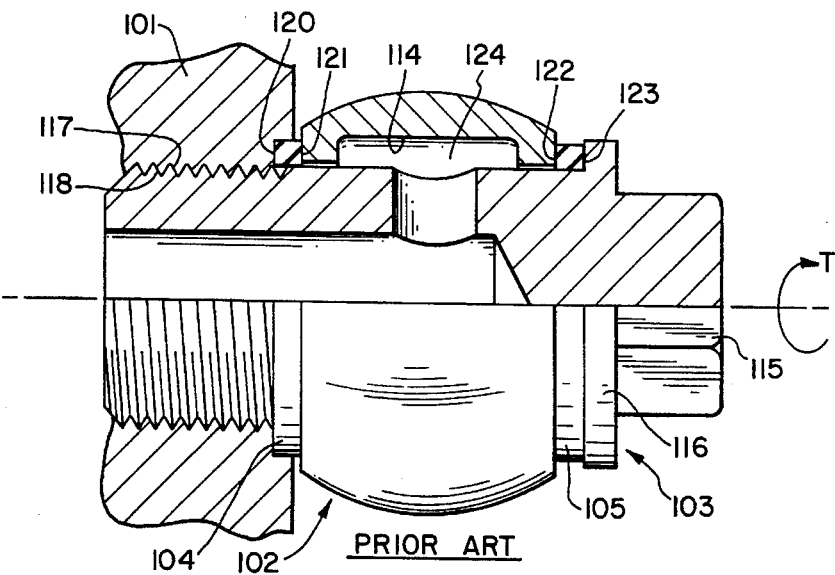
FIG. 2 is a side view, in partial cross section, of a prior art "banjo" coupling assembled.
Figure 3:
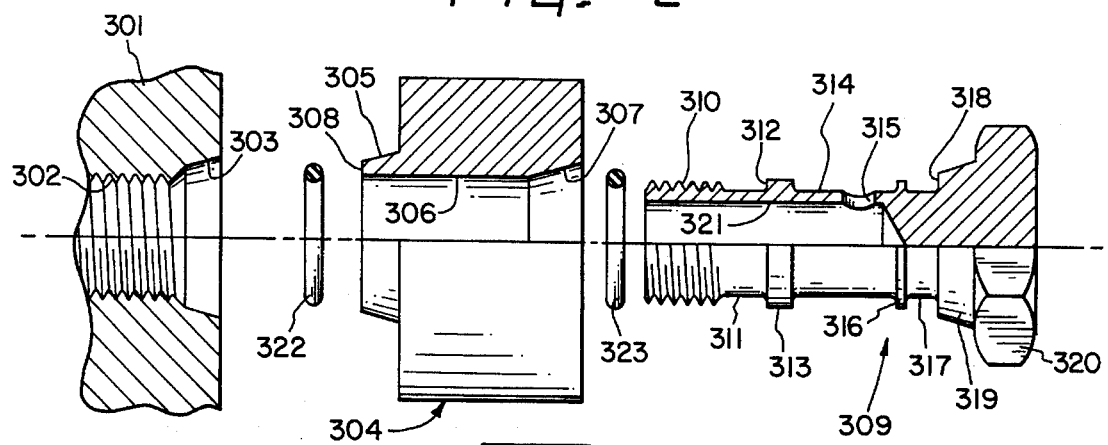
FIG. 3 is a side view, in partial cross-section, of the transvers hydraulic coupling before assembly.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates preferred embodiments of the invention, in several forms, and such exemplifications are not to be construed as limiting the scope of the invention in any manner.

DESCRIPTION OF THE PREFERRED EMBODIMENT

The preferred embodiments disclosed below are not intended to be exhaustive or limit the invention to the precise forms disclosed in the following detailed description. Rather, the embodiments are chosen and described so that others skilled in the art may utilize their teachings.

The present invention relates to hydraulic couplings, and particularly to couplings which utilize the elastic properties of materials, for example metals or o-rings, to form sealing contact between mating components. In the description below, embodiments of an inventive transverse coupling are detailed to further the understanding of the improved transverse coupling of the present invention.

The inventor of the present invention has previously developed a transverse hydraulic coupling based on consideration of the same requirements. The transverse coupling includes a tapered metal-to-metal interface backed up by an optional o-rings which are shown in FIGS. 3–6. The transverse coupling comprises port 301, body 304, and bolt 309. Port 301 has internal threads 302 and a tapered surface 303 into which fits external taper 305 of body 304. Body 304 defines axial passageway 306 which is in fluid communication with port 301, and includes annular surface 308 facing port 301. At the distal end of body 304 is an internal taper 307 which mates with external taper 319 on the bolt 309. Bolt 309 has surfaces 311 and 317 which may support optional o-rings 322 and 323 in pockets 327 and 328, respectively. Pocket 327 is defined between surface 311, tapered surface 303, and annular surfaces 312 and 308 of bolt 309 and body 304, respectively. Pocket 328 is defined between extension 316, surface 317, annular surface 318, and tapered surface 307.

During assembly, if o-rings are desired then o-ring 323 is first placed on surface 317. Bolt 309 is then assembled into body 304 and o-ring 322 is placed on surface 311. In the situation where o-rings 322 and 323 are used, which will be in the majority of cases, the fitting formed by bolt 309 and body 304 is held together by o-ring 323, which is an advantage during final attachment to port 301.

Figure 4:
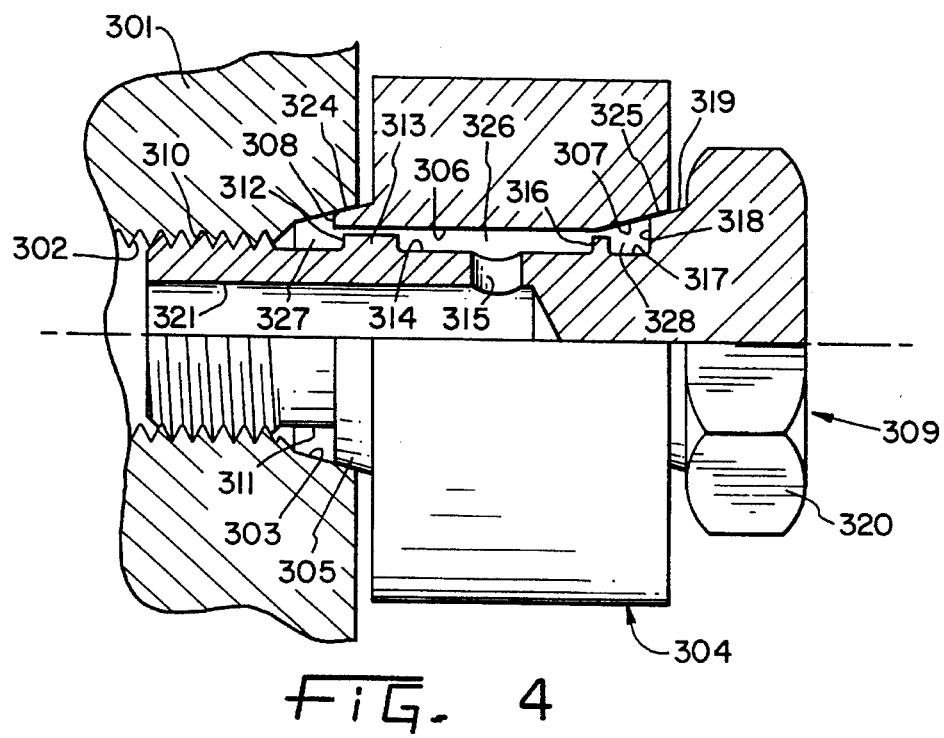
FIG. 4 is a side view, in partial cross-section, of the coupling of FIG. 3 assembled without o-rings.
Figure 5:
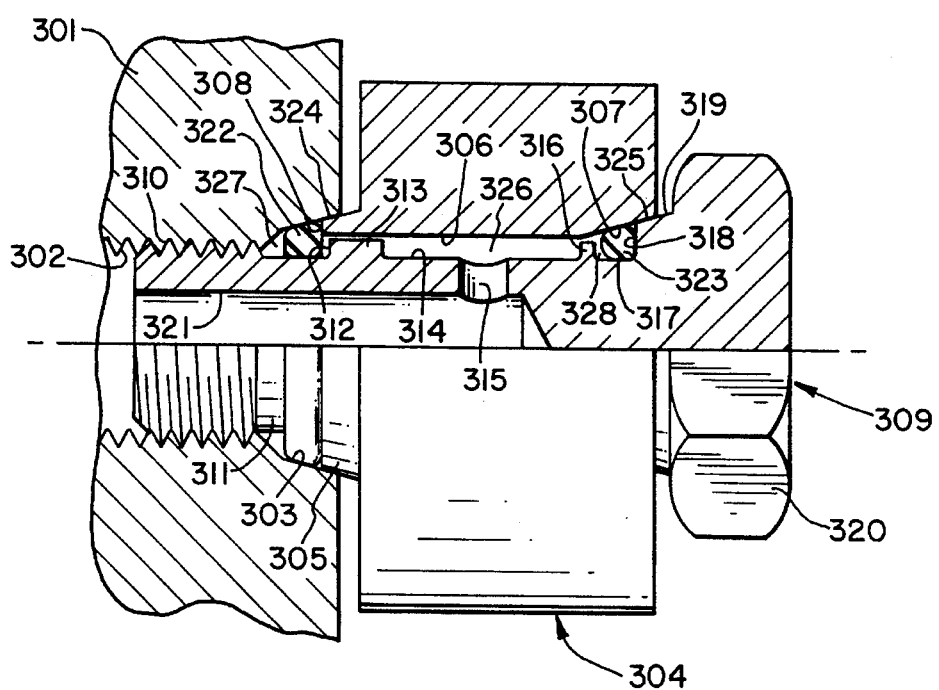
FIG. 5 is a side view, in partial cross-section, of the coupling of FIG. 3 assembled with o-rings.

Once bolt 309 is assembled through body 304, the bolt/body combination is then assembled to port 301 by engagement of threads 310 of bolt 309 with threads 302 of port 301. As torque is applied to hex head 320 of bolt 309, the mating tapers of bolt-to-body and of body-to-port create very high unit loading and invoke elastic memory between mating parts. The net result of the mating tapers is a coupling which seals at relatively low torques and, due to the elasticity in the interface, remains sealed over considerable time. Referring to FIG. 4, seals are formed at locations 324 and 325 which provide such an elastic interface. When o-rings 322 and 323 are used (see FIG. 5), the reliability of the system is enhanced considerably.

Figure 6:
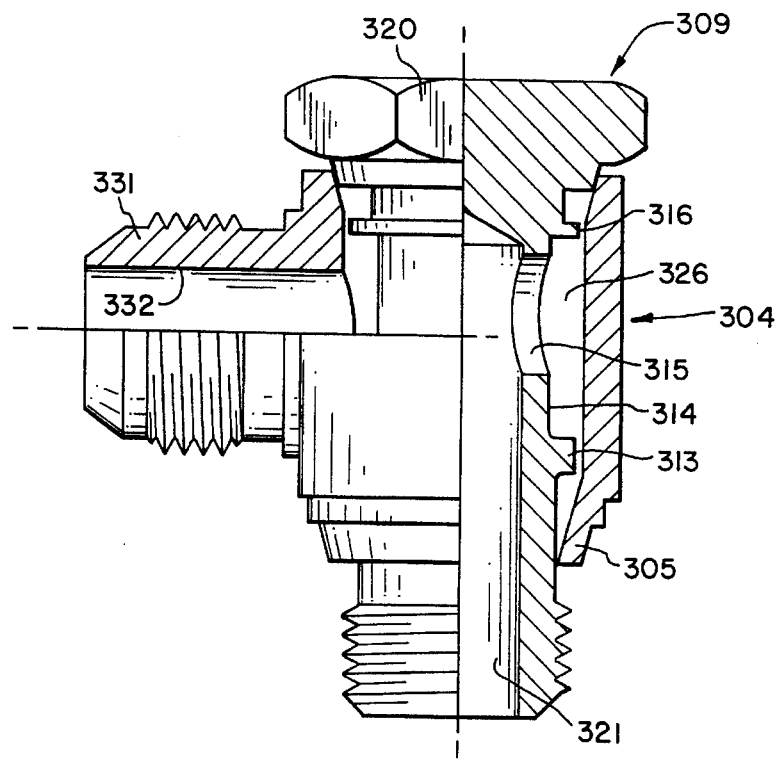
FIG. 6 is a side view, in partial cross-section, of the coupling of FIG. 3 assembled with o-rings.

The internal fluid conduit provided by body 304 is defined by internal cylindrical wall 306 and bolt 309. Specifically, the conduit includes chamber 326, aperture 315, and bore 321. Chamber 326 is defined by wall 306 and outer surface 314 of bolt 309, and also may be further defined by extensions 313 and 316 of bolt 309. Bore 321 is in fluid communication with chamber 326 by virtue of aperture 315 which is located on outer surface 314. Referring to FIG. 6, another passageway 332, which is transverse to bore 321, is defined by arm 331 of body 309. Passageway 332 is in fluid communication with chamber 326 to thereby provide a fluid conduit for flow from a tube, or other device which may be attached to arm 331, to port 301.

Figure 7:
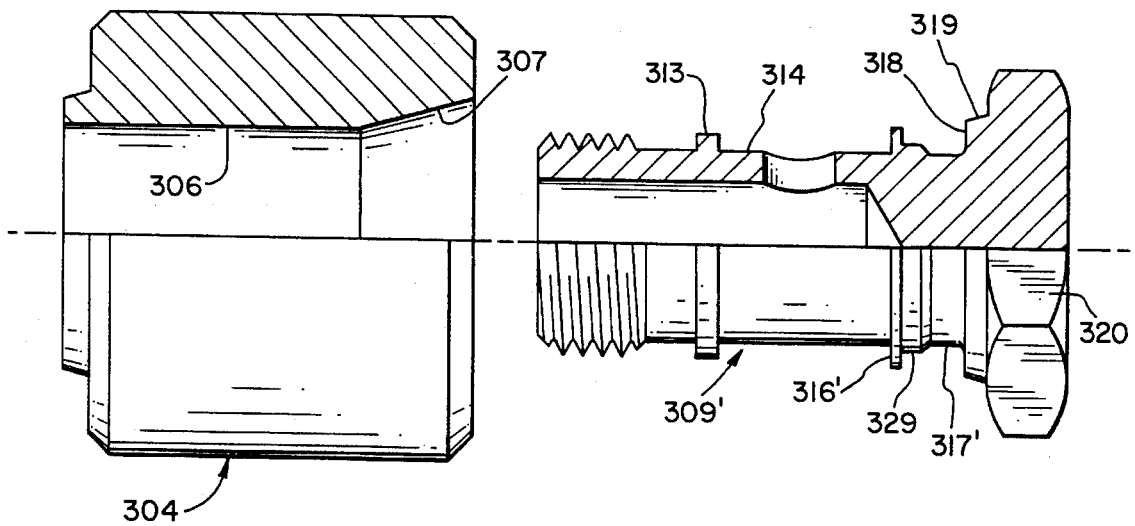
FIG. 7 is a side view, in partial cross-section, of a second embodiment of the transverse port fitting before assembly.
Figure 8:
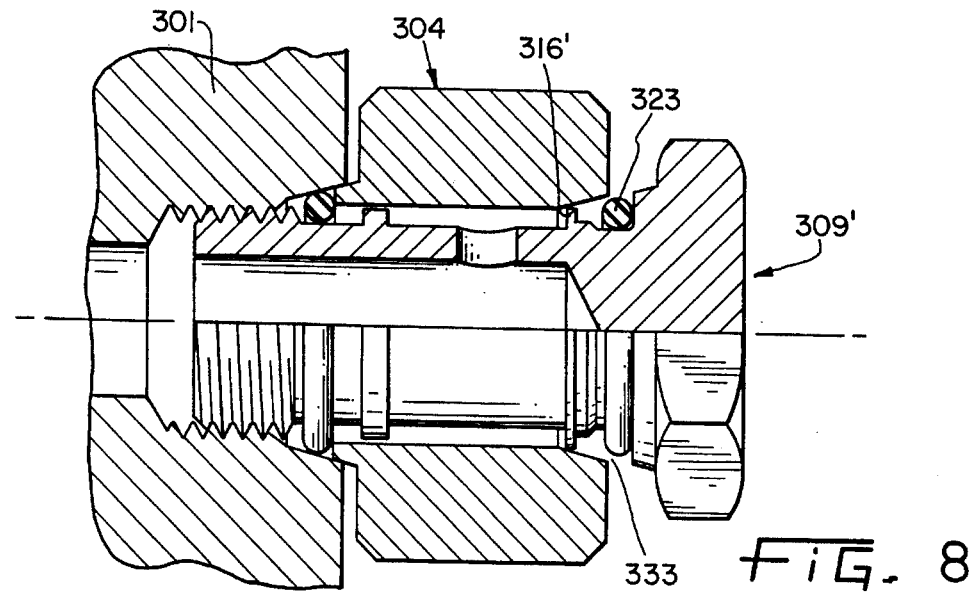
FIG. 8 is a side view, in partial cross-section, of the coupling of FIG. 7 after manual assembly and tightening.
Figure 9:
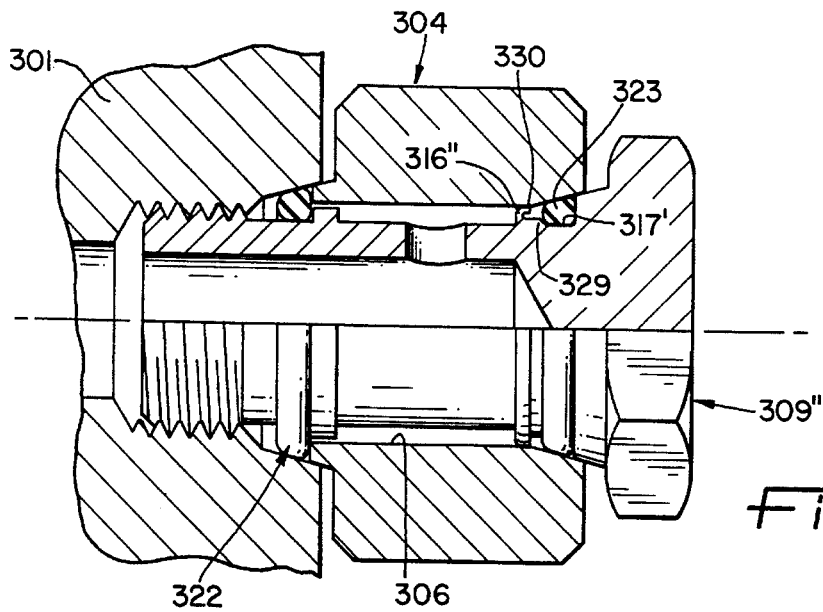
FIG. 9 is a side view, in partial cross-section of the coupling of FIG. 8 after tightening with a tool.

An alternative embodiment of the transverse coupling is shown in FIGS. 7–9. This embodiment is similar to the embodiment of FIGS. 3–6 except for bolt 309' which has a different structure and arrangement between outer surface 314 and annular surface 318 which allows for easily detecting a coupling that is only manually tightened. Extension 316' of bolt 309' has an outer diameter which is greater than the diameter of internal cylindrical wall 306 so that when bolt 309' is manually tightened to port 301, extension 316' contacts tapered surface 307 and creates gap 333 which prevents o-ring 323 from forming a seal with tapered surface 307 (see FIG. 8). Thus, when bolt 309' is hand tightened to port 301, a leak will be apparent when pressurized fluid is directed through the coupling.

Upon subsequent tightening of bolt 309' with a tool, bolt 309" is sealingly connected to port 301. The tool tightening of bolt 309" forces extension 316" (see FIG. 9) into internal surface 306 and deforms extension 316' into sealing contact 330 with wall 306. Raised portion 329 prevents o-ring 323 from being trapped by deformed extension 316" with raised portion 329 separating o-ring seating surface 317' from extension 316". Also, o-ring 323 is placed into sealing contact with tapered surface 307. These two seals are in addition to seal 325 formed between external taper 319 and tapered surface 307. Thus, tightening of bolt 309' by a tool creates deformed bolt 309" having three seals with body 304.

Figure 10:
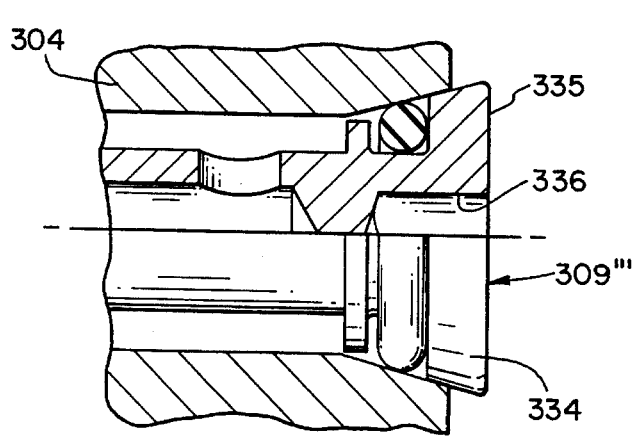
FIG. 10 is a side view, in partial cross-section, of a third embodiment of the transverse coupling having a socket head.
Figure 11:
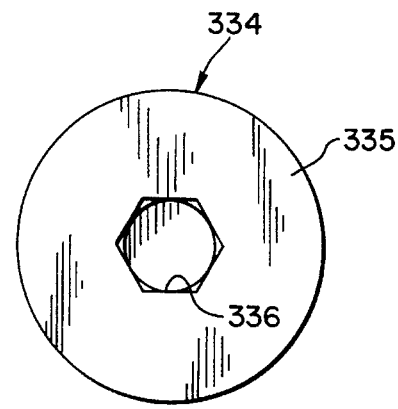
FIG. 11 is an end view of the socket head of FIG. 10.

FIGS. 10 and 11 show a third embodiment of the transverse coupling including bolt 309'" having socket head 334. Generally circular socket head 334 includes flat face 335 and hexagonal recess 336 for receiving an allen wrench. With prior art hydraulic couplings, a great amount of torque is applied to the bolt in order to achieve proper sealing. If a socket head would be provided on a prior art design, then the internal sides of the socket would be stripped by the application of the required high tightening torque. Therefore, prior art couplings are constrained to using an exterior hex head design in order to receive the tightening torque. However, in the present invention lower tightening torques are required and socket head 334 may replace hex head 320 on the bolt and provide a more streamlined joinder with body 304 which also may be an easier method of tightening the bolt, i.e., with an allen wrench.

In the preferred embodiments, the connector portions of the hydraulic couplings (i.e., bolt 309 of the transverse coupling) are made of material such as mild steel, stainless steel, monel, titanium, aluminum, brass, and various machinable alloys as well as certain plastics. The conduit portions of the hydraulic coupling (i.e., body 304) are made of material such as copper, brass, mild steel, stainless steel, titanium, aluminum, and various malleable/machinable alloys as well as certain plastics. The angle of the tapered surfaces of the coupling interfaces (i.e., 303 of the banjo port, and 307 of the banjo body portion) is in the range of 5° to 45° more particularly in the range of 10° to 30°, and preferably about 15°.

Figure 12:
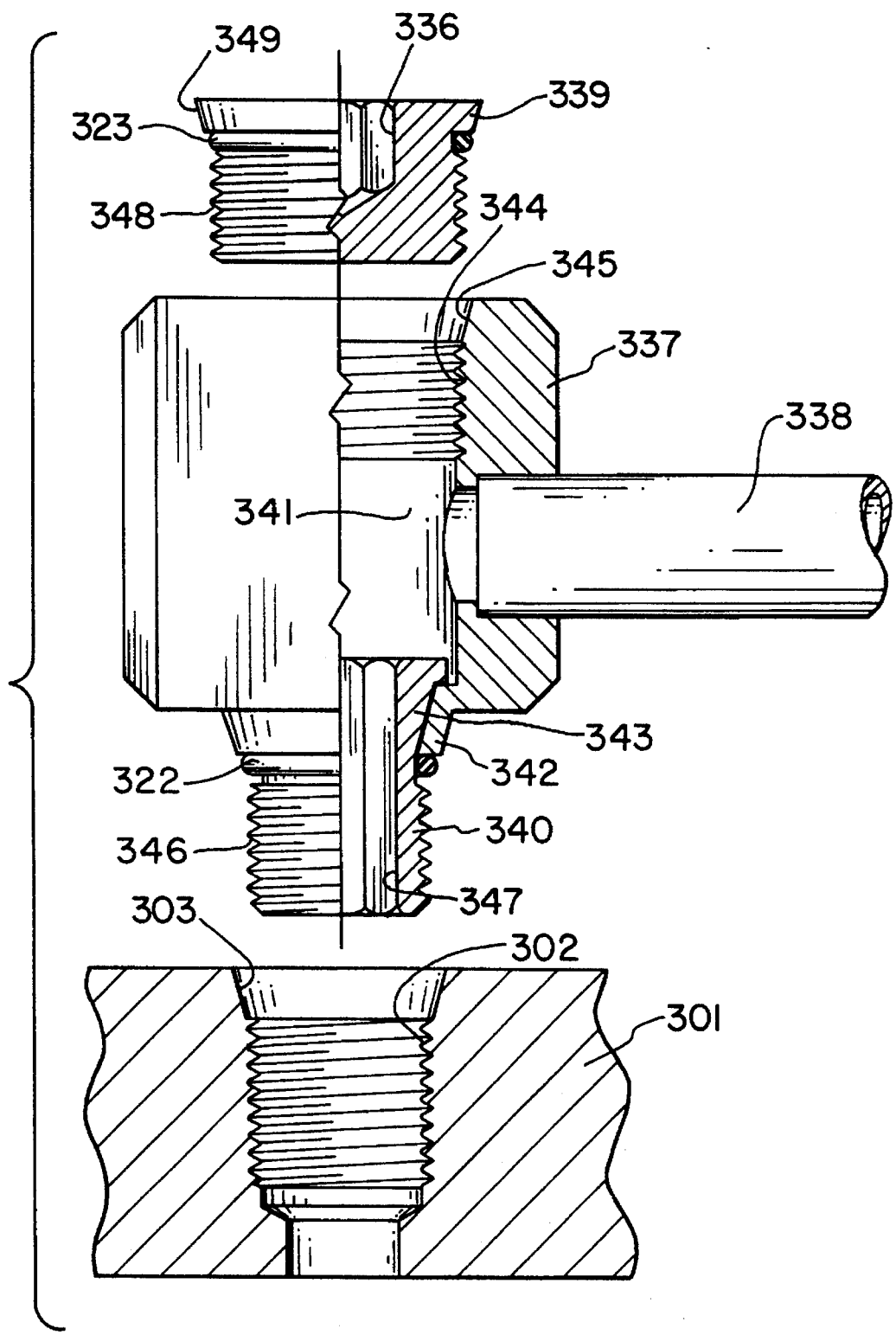
FIG. 12 is a side view, in partial cross-section, of a fourth embodiment of the transverse coupling.

FIG. 12 shows a fourth embodiment of the transverse coupling. In this embodiment, both the connector and the conduit elements are formed from two elements. The conduit element includes body 337 and tube 338, which is preferably connected to body 337 by brazing or the like. The connector element includes top engaging portion 339 and body engaging portion 340. Body 337 includes through aperture 341 which is in fluid communication with tube 338. Lip portion 342 is located at the bottom end of body 337 and defines an opening facing port 301. Lip portion 342 has an internal tapered surface which is complementary to external tapered surface 343 of port engaging portion 340, and an external tapered surface which is complementary to tapered surface 303 of port 301. Threaded portion 344 and internal tapered surface 345 are located at the top end of body 337 and are adapted to receive top engaging portion 339.

The fourth embodiment attaches to port 301 by first threadedly engaging threads 346 of port engaging portion 340 with internal threads 302 of port 301. Port engaging portion 340 includes hexagon shaped through aperture 347 which allows for an allen wrench or the like to be used to turn and tighten the engagement of threads 346 with threads 302. By tightening port engaging portion 340, lip portion 342 is forced into sealing contact between tapered portion 343 and tapered surface 303 of port 301. O-ring 322 may optionally be disposed around port engaging portion 340 between tapered portion 343 and threads 346 to enhance the reliability of the seal. Further, through aperture 347 allows for fluid communication between port 301 and tube 338. After port engaging portion 340 is secured in port 301, external threads 348 of top engaging portion 339 may be threadedly engaged with internal threads 344. Top engaging portion 339 includes hexagonal recess 336 which is adapted to receive an allen wrench for tightening. External taper 349 is located at the top of top engaging portion 339 and generally matches the shape of internal tapered surface 345 of body 337 so that a sealing contact is made when top engaging portion 339 is turned and tightened. O-ring 323 may optionally be disposed around top engaging portion 339 between threads 348 and external taper 349 to enhance the reliability of the seal.

Figure 13:
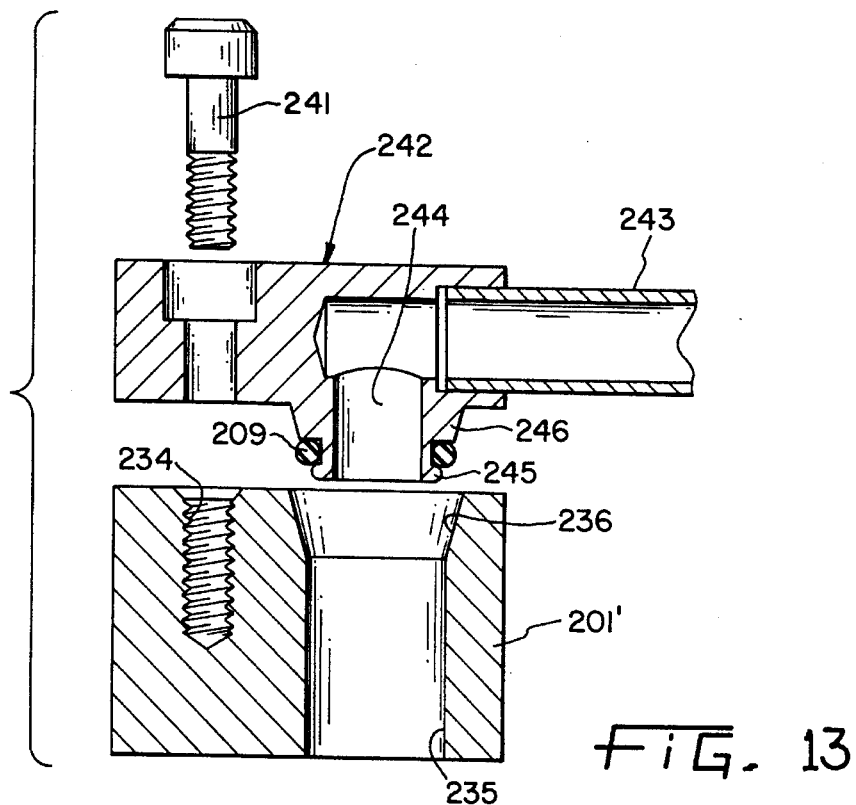
FIG. 13 is a side view, in partial cross-section, of a fifth embodiment of the transverse coupling.

FIG. 13 shows a fifth embodiment of the transverse coupling. Bolt 241 of FIG. 30 secures block 242 to port 201'. However, transverse tube 243 is connected to passageway 244 of block 242, and tube 243 defines an axis located transverse to the axis defined by port passageway 235. Tube 243 may be attached to block 242 by brazing or the like. Block passageway 244 is in fluid communication with port passageway 235 and is sealed by lip portion 245 and wall portion 246. Optionally, o-ring 209 may be disposed in the groove between lip portion 245 and wall portion 246. When bolt 241 engages threaded bore 234 and is tightened, block 242 is securely fastened to port 201' and lip portion 245 and wall portion 246 are brought into sealing engagement with tapered portion 236.

Figure 14:
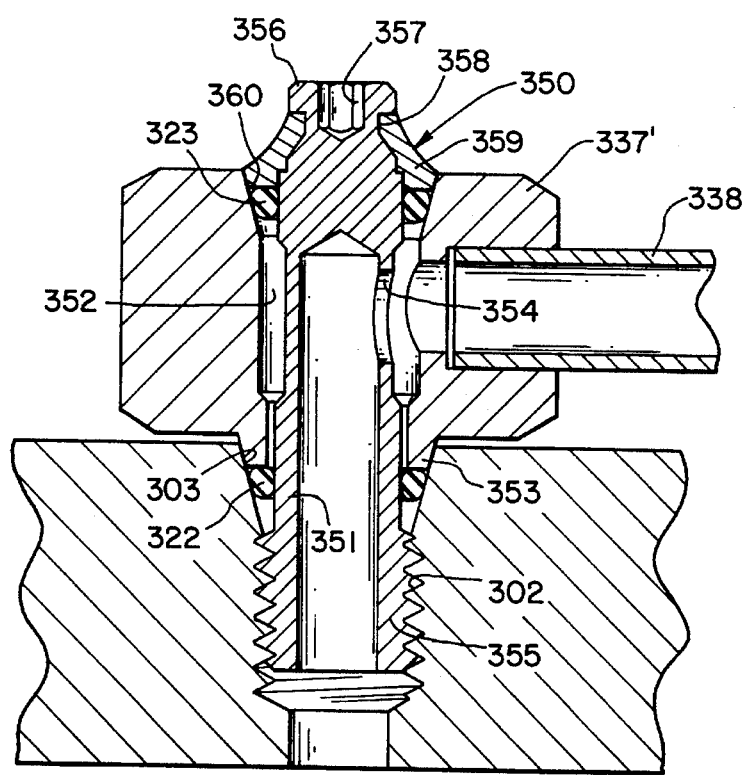
FIG. 14 is a side view, in partial cross-section, of a sixth embodiment of the transverse coupling.

FIG. 14 shows a sixth embodiment of the transverse coupling. In this embodiment, both the connector and the conduit elements are formed from two elements. The conduit element includes body 337' and tube 338, which is preferably connected to body 337' by brazing or the like. The connector element includes top engaging portion 350 and body engaging portion 351. Body 337' includes through chamber 352 which is in fluid communication with tube 338. Lip portion 353 is located at the bottom end of body 337' and defines an opening facing port 301. Lip portion 353 may have an external tapered surface which is complementary to tapered surface 303 of port 301. Engaging portion 351 has an internal bore in communication with a passageway of port 301, and aperture 354 provides fluid communication between the bore of engaging portion 351 and chamber 352. Engaging portion 351 also has threaded portion 355 which engages threads 302 of body 301, and top portion 356 with hex socket 357 and annular groove 358. Top engaging portion 350 comprises a collar which is located in a relatively fixed position relative to port engaging portion 351 between annular groove 358 of top portion 356 and body 337'; and collar 350 may be formed by locating a suitable ring of metal around port engaging portion 351 and striking the ring with a tapered die or the like to deform the material into collar 350 that fits between top portion 356 and body 337' and provides rim portion 359 with an external tapered surface matingly engaging tapered surface 360.

The sixth embodiment attaches to port 301 by first threadedly engaging threads 355 of port engaging portion 351 with internal threads 302 of port 301. Port engaging portion 351 may then be tightened to create an interference fit with collar 350, with external tapered surface 359 sealingly engaging tapered surface 360 of body 337'. O-ring 323 may optionally be disposed around port engaging portion 351 between aperture 354 and collar 350 to enhance the reliability of the seal. Port engaging portion 351 includes hex socket 357 which allows for an allen wrench or the like to be used to turn and tighten the engagement of threads 355 with threads 302. Tightening port engaging portion 351 also causes lip portion 353 to be forced into sealing contact with tapered surface 303 of port 301. O-ring 322 may optionally be disposed around port engaging portion 351 between tapered portion 353 and threads 355 to enhance the reliability of the seal. Further, a passageway is created through the bore of port engaging portion 351 and aperture 354 providing for fluid communication between port 301 and tube 338.

In the embodiment of FIG. 14, the connection of port engaging portion 351 to port 301 may alternatively be accomplished previous to securing body 337' to top portion 356. In this alternative method, body 337' is placed over the previously connected port engaging portion 351 and a ring for forming collar 350 is positioned on body 337'. The ring may then be struck with a die or the like to form collar 350 having external tapered surface 359. Port engaging portion 351 may be further tightened to enhance the interference fit of collar 350. This allows the preassembly of port engaging portion 351 to port 301, which may be advantageous in some manufacturing processes.

Figure 15:
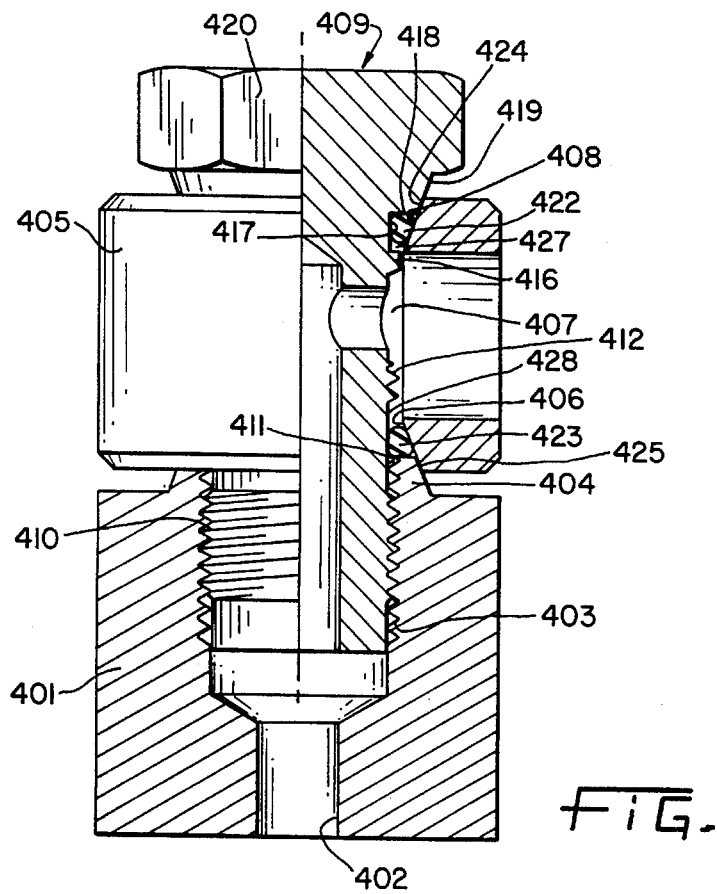
FIG. 15 is a side view, in partial cross-section, of a first embodiment of the present invention.

In accordance with the present invention, FIG. 15 shows a transverse coupling with a lipped port. The transverse coupling comprises port 401, body 405, and bolt 409. Port 401 has internal threads 403 leading to passageway 402, and a tapered lip 404 which extends into and is complementary to internal taper 406 of body 405. Body 405 defines axial passageway 407 which is in fluid communication with port 401. At the distal end of body 405 is an internal taper 408 which mates with external taper 419 on the bolt 409. Bolt 409 has surfaces 411 and 417 which may support optional o-rings 422 and 423 in pockets 427 and 428, respectively. Pocket 428 is defined between surface 411, lip 404, and inner tapered surface 406. Pocket 427 is defined between extension 416, surface 417, annular surface 418, and tapered surface 408.

During assembly, if o-rings are desired then o-ring 422 is first placed on surface 417. Bolt 409 is then assembled into body 405 and o-ring 423 is placed on surface 411. In the situation where o-rings 422 and 423 are used, which will be in the majority of cases, the fitting formed by bolt 409 and body 405 is held together by o-rings 422 and 423, which is an advantage during final attachment to port 401.

Bolt 409 also includes threads 412 which are located on bolt 409 about its mid-section so that when the fitting is assembled, threads 412 are located in passageway 407. The short length of threads 412 serves as an alignment feature, having an outer diameter only slightly smaller than the inner diameter of passageway 407. Threads 412 keeps bolt 409 properly aligned with internal threads 403 of port 401 so that assembly torques do not inadvertently damage the softer material which may comprise lip 404 if port 401 is made of plastic material. Also, threads 412 provide a helical flow path for the pressurized fluid so that o-ring 423 is maintained against lip 404 and internal tapered surface 406.

Once bolt 409 is assembled through body 405, the bolt/body combination is then assembled to port 401 by engagement of threads 410 of bolt 409 with threads 403 of port 401. As torque is applied to hex head 420 of bolt 409, the mating tapers of bolt-to-body and of body-to-port create very high unit loading and invoke elastic memory between mating parts. The net result of the mating tapers is a coupling which seals at relatively low torques and, due to the elasticity in the interface, remains sealed over considerable time. Seals are formed at locations 424 and 425 which provide such an elastic interface. When o-rings 422 and 423 are used, the reliability of the system is enhanced considerably.

Figure 16:
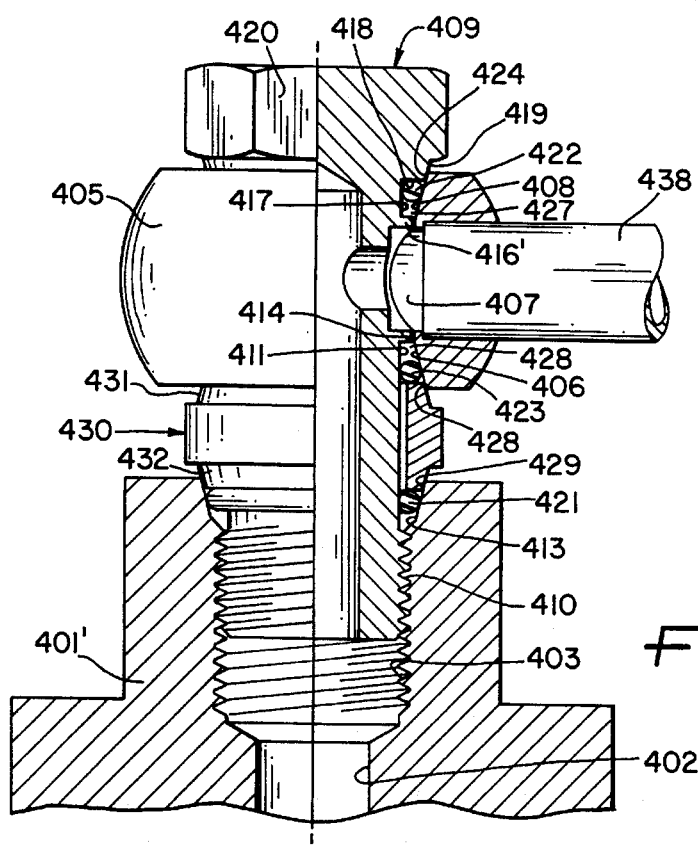
FIG. 16 is a side view, in partial cross-section, of a second embodiment of the present invention.

Another embodiment of the present invention is shown in FIG. 16, wherein the lip of the port is a separate piece. The transverse coupling of FIG. 16 comprises port 401', body 405 bolt 409, and collar 430. Port 401' has internal threads 403 leading to passageway 402, and an internal tapered surface 413 which is contoured similarly to tapered surface 303 of the above disclosed transverse couplings. Body 405 defines axial passageway 407 which is in fluid communication with port 401'. At the distal end of body 405 is an internal taper 408 which mates with external taper 419 on the bolt 409. Bolt 409 has surfaces 411 and 417 which may support optional o-rings 422 and 423 in pockets 427 and 428, respectively. Pocket 428 is defined between surface 411, extension 414, collar 430, and inner tapered surface 406 Pocket 427 is defined between extension 416', surface 417, annular surface 418, and tapered surface 408.

Collar 430 has external tapered surfaces 431 and 432 which sealingly engage body 405 and port 401', respectively. External tapered surface 431 extends into body 405 to engage internal tapered surface 406. Also, external tapered surface 432 extends into port 401' to engage internal tapered surface 413. Optional o-ring 421 may be disposed within internal tapered surface 413 to form an addition seal to the contact seal between external tapered surface 432 and internal tapered surface 413. Collar 430 may be crimp-formed onto bolt 409. Alternatively, collar 430 may be rolled down during the assembly process to fit within the internal tapered surfaces 406 and 413, respectively.

During assembly, if o-rings are desired then o-ring 422 is first placed on surface 417. Bolt 409 is then assembled into body 405 and o-ring 423 is placed on surface 411. Next, collar 430 is located over bolt 409, and o-ring 421 is lastly located on bolt 409. In the situation where o-rings 421, 422, and 423 are used, which will be in the majority of cases, the fitting formed by bolt 409, body 405, and collar 430 is held together by o-rings 421, 422, and 423, which is an advantage during final attachment to port 401'.

Once bolt 409 is assembled through body 405, the bolt/body combination is then assembled to port 401' by engagement of threads 410 of bolt 409 with threads 403 of port 401'. As torque is applied to hex head 420 of bolt 409, the mating tapers of bolt-to-body, of body-to-collar, and of collar-to-port create very high unit loading and invoke elastic memory between mating parts. The net result of the mating tapers is a coupling which seals at relatively low torques and, due to the elasticity in the interface, remains sealed over considerable time. Seals are formed at locations 424 (between bolt 409 and body 405), 428 (between body 405 and collar 430), and 429 (between collar 430 and port 401') which provide such an elastic interface. When o-rings 421, 422, and 423 are used, the reliability of the system is enhanced considerably.

Figure 17:
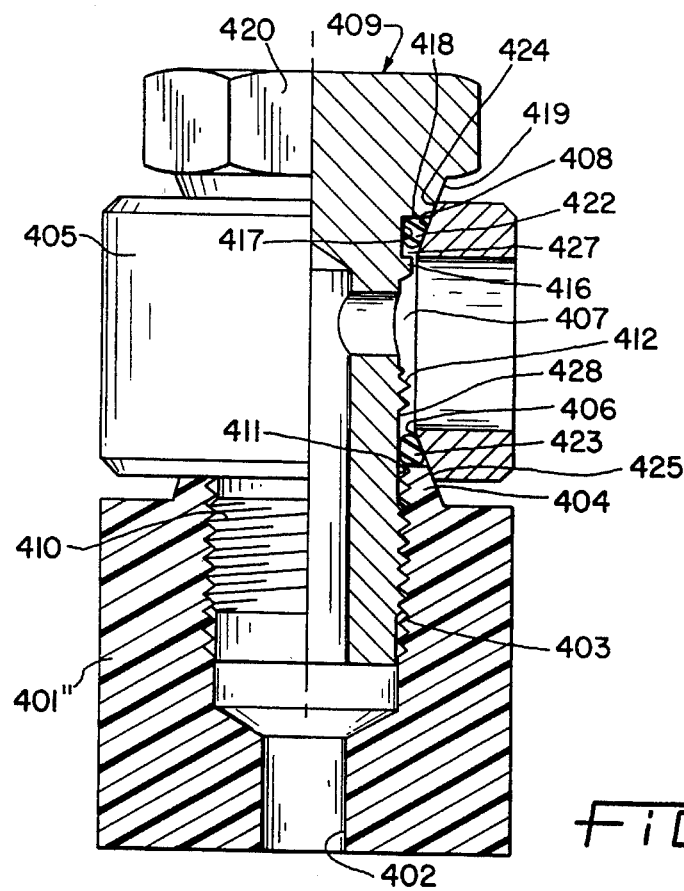
FIGS. 17 and 18 show third and fourth embodiments of the present invention corresponding to FIGS. 15 and 16, respectively, wherein the port is made of plastic material.
Figure 18:
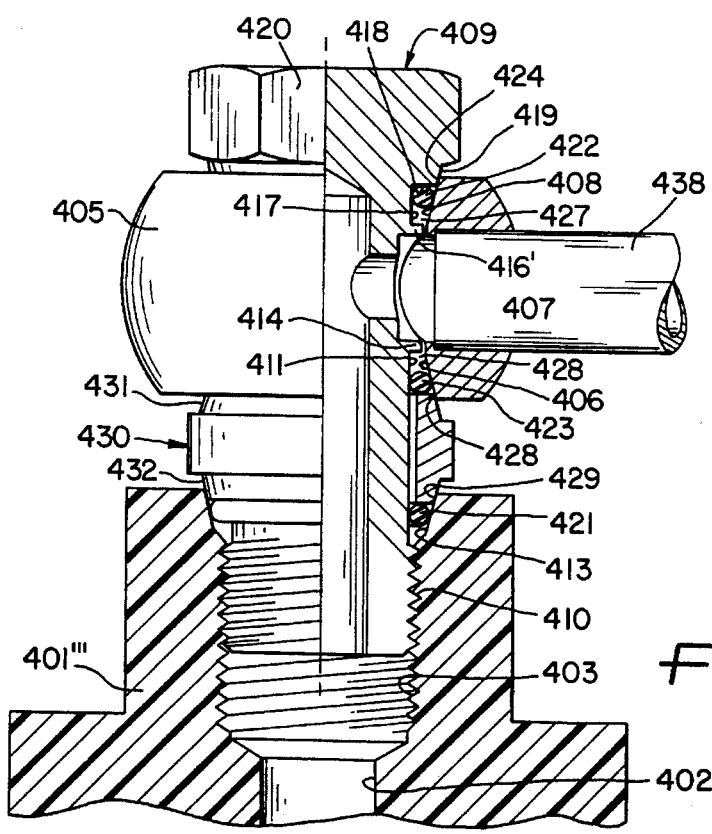

The present invention is particularly beneficial for port housings consisting of plastic material. FIGS. 17 and 18 show embodiments of the invention similar to the embodiments of FIGS. 15 and 16, respectively, wherein ports 401" and 401'" are made of a plastic material. For plastic port housings, an internally tapered entryway suffers from hoop stress and cracking under pressure. Also, application of assembly torques may even generate hoop stress in the plastic port which leads to failure of the connection. The lip of the port extending to contact an internal taper of the conduit body opposes the pressurized forces of the fluid, and opposes the hoop stress associated with assembly. Further, although the raised lip has been described in terms of a plastic housing, the structure of the invention is equally applicable to other materials where a lip is preferred on the port rather than on body 405.

Thusly, any of the six embodiments of the transverse coupling disclosed above may be reconfigured with a lipped port as disclosed in FIGS. 15 and 16 and described above. It is possible to machine an external taper onto the parent unit to which the transverse coupling is to be assembled. Further, a welded-on boss may be processed with a screw-machine to form the internal threads and external taper necessary for a port of the present invention. Alternatively, a collar such as shown in FIG. 16 may be used to provide the port with a lipped port configuration. The present invention is therefore capable of being retrofitted with existing ports as well as being utilized for a newly made component, e.g., a brake caliper or power steering cylinder.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydraulic coupling comprising:

a port including an opening, a portion defining a passageway in communication with said opening, an internally threaded portion in communication with said passageway, and a lip extending from said port;

conduit means for providing fluid communication between said port and a tube located transversely in relation to said port, said conduit means including a conduit body defining an axial chamber, said conduit means also including an extension defining a channel transversely located in relation to said axial chamber, said channel and said passageway being in fluid communication, said conduit means further including an inner surface which sealingly contacts said lip of said port;

a connector for sealingly securing said conduit means to said port, said connector extending through said conduit means, said connector including an axial bore, said connector having a smaller diameter than said axial chamber, said connector also including a rim which sealingly contacts said conduit means, said connector further including an externally threaded portion adapted to engage said internally threaded portion of said port and by threaded engagement force said lip into sealing contact with said inner surface of said conduit means and force said rim into sealing contact with said conduit means, said connector defining a seating portion distinct from said externally threaded portion; and a sealing ring disposed in a pocket defined by said seating portion of said connector, said conduit means, and said port.

2. The hydraulic coupling of claim 1 wherein said port is comprised of plastic material.

3. The hydraulic coupling of claim 1 wherein said connector includes a body with an axial bore and two annular projections, said conduit body, said connector body, and said annular projections define an internal cavity, and said hole is located between said annular projections whereby a fluid flow path is provided from said channel to said internal cavity and through said hole and said bore of said connector to said passageway of said port.

4. The hydraulic coupling of claim 3 further comprising two sealing rings, wherein said connector includes a first seating portion located between said lip and said external threaded portion on a first end of said connector, and a second seating portion located adjacent to said annular projections on a second end of said connector, said sealing rings located on said first and second seating portions of said conduit means.

5. The hydraulic coupling of claim 1 further comprising an o-ring wherein said connector includes a seating portion receiving said o-ring, said connector including an annular extension adjacent said seating portion with an outer diameter greater than the diameter of said axial chamber of said conduit means which prevents sealing contact between said o-ring and said a second inner conduit surface after manual tightening of said connector, said annular extension being made of material which does not deform when said connector and said conduit means are threaded together hand tight without a tool.

6. The hydraulic coupling of claim 1 wherein said connector includes a port engaging portion and a separate said rim, and said rim includes a portion engaging said conduit means.

7. The hydraulic coupling of claim 1 wherein said conduit means includes an internally tapered surface facing away from said port, and said rim contacts said internally tapered surface of said conduit means.

8. The hydraulic coupling of claim 7 wherein said rim has tapered surface substantially complementary to said internally tapered surface of said conduit means.

9. The hydraulic coupling of claim 7 wherein said rim of said connector is separate from said threaded means of said connector, and said rim includes a collar disposed in a locking fit between said threaded means and said conduit means to thereby locate said rim in fixed relation to said threaded means.

10. The hydraulic coupling of claim 1 wherein said lip has a tapered surface substantially complementary to said inner tapered surface of said conduit means.

11. The hydraulic coupling of claim 1 wherein said connector includes a socket head for receiving torque to rotate said connector.

12. The hydraulic coupling of claim 1 wherein said connector includes threaded engagement means and a block, said block has integral rim and inner surface portions defining a portion of said axial chamber, said block includes a first opening for receiving said threaded engagement means, said block includes a second opening for receiving the tube, said block includes a third opening defined by said inner surface portion and disposed in facing relation to said port passageway, and said block provides fluid communication between said second opening and said third opening.

13. The hydraulic coupling of claim 1 wherein said threaded means and said rim of said connector are separate, said threaded means includes a threaded cylindrical body and a through bore in communication with said axial chamber, and said rim includes means for engaging said conduit means body in an interference fit and thereby seal one end of said axial chamber.

14. A hydraulic coupling comprising:

a port including an opening, a portion defining a passageway in communication with said opening, an internally threaded portion in communication with said passageway, and a lip extending from said port;

conduit means for providing fluid communication between said port and a tube located transversely in relation to said port, said conduit means including a body defining an axial chamber, said conduit means also including an extension defining a channel transversely located in relation to said axial chamber, said channel and said passageway being in fluid communication, said conduit means further including an inner surface which sealingly contacts said lip of said port;

connector means for sealingly securing said conduit means to said port, said connector means extending through said conduit means, said connector means including a body with an axial bore, said connector means also including a rim which sealingly contacts said conduit means, said connector means further including an externally threaded portion adapted to engage said internally threaded portion of said port and by threaded engagement force said lip into sealing contact with said inner surface of said conduit means and force said rim into sealing contact with said conduit means; and a sealing ring, said connecting means including a seating portion receiving said sealing ring, said connecting means including an annular extension adjacent said seating portion with an outer diameter greater than the diameter of said axial chamber of said conduit means which prevents sealing contact between said sealing ring and said conduit tapered surface after manual tightening of said connector means, said annular extension being made of material which does not deform when said connector means and said conduit means are threaded together hand tight without a tool.

* * * * *